July 2, 1968 W. GRIESELHUBER 3,390,777
FEED-STRAINING CONTINUOUS CENTRIFUGAL BASKET
WITH TRASH TRAPPING MEANS
Filed Nov. 19, 1964
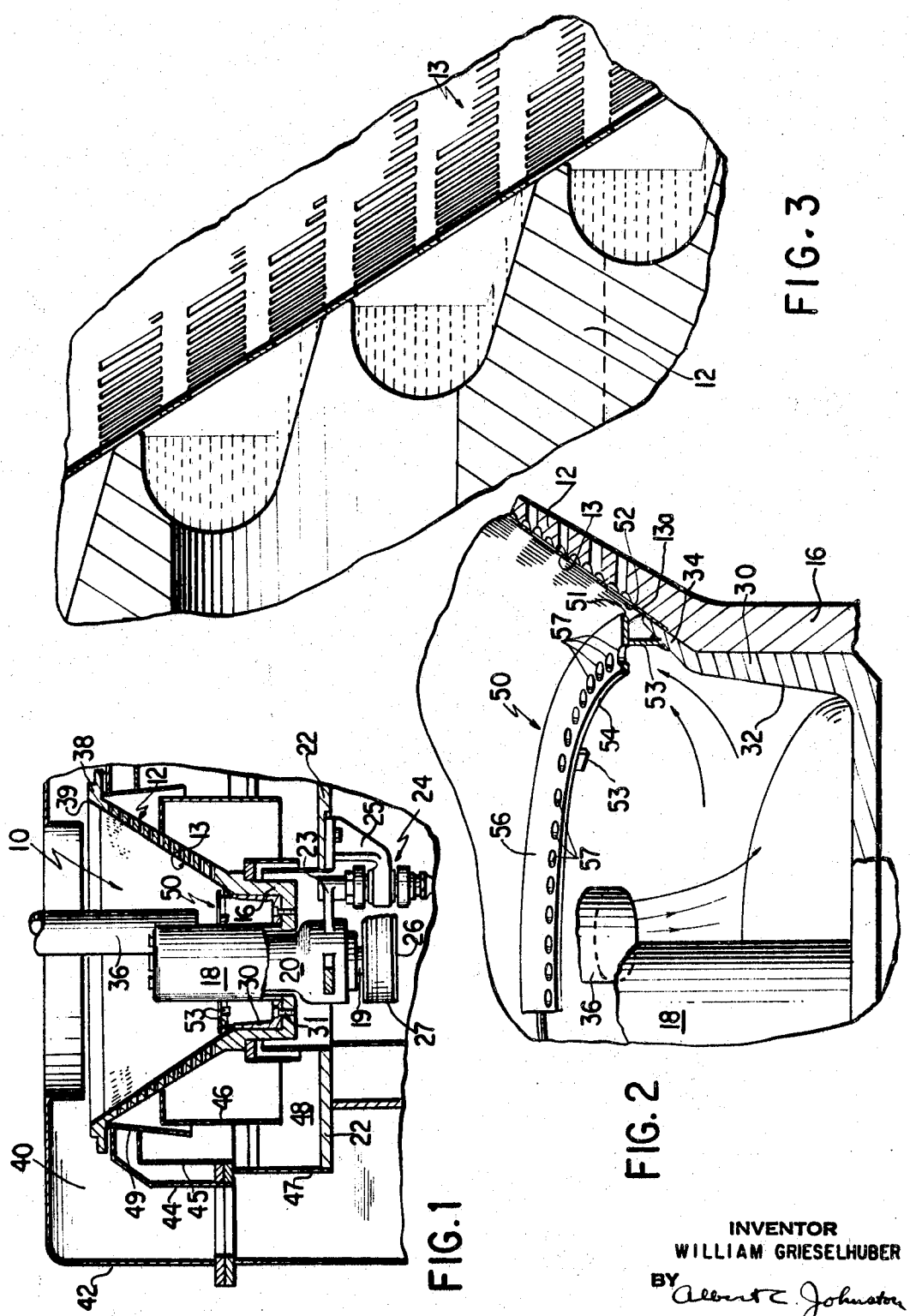
INVENTOR
WILLIAM GRIESELHUBER
BY
ATTORNEY

United States Patent Office 3,390,777
Patented July 2, 1968

3,390,777
FEED-STRAINING CONTINUOUS CENTRIFUGAL BASKET WITH TRASH TRAPPING MEANS
William Grieselhuber, Hamilton, Ohio, assignor to The Western States Machine Company, Hamilton, Ohio, a corporation of Utah
Filed Nov. 19, 1964, Ser. No. 412,474
7 Claims. (Cl. 210—297)

ABSTRACT OF THE DISCLOSURE

A centrifugal filter basket having a feed accelerating cup at the bottom thereof receiving the feed and a trash trapping ring attached to the cup to remove trash from feed passing from the cup to the filter.

---

This invention relates to continuous centrifugal machines of the type making use of a conical basket rotated continuously at high speed for the separation of liquid and solid components of a feed material, such, for example, as a sugar massecuite or magma, delivered continuously into the basket. More particularly, the invention concerns an improvement in the conical basket construction whereby the fine screen thereof utilized for the filtration of the liquid from the solids is protected against damage by oversize solids such as lumps and foreign objects or trash present in the feed material.

In continuous centrifugals of the conical basket type, the basket commonly comprises a perforated frusto-conical wall having a filtering screen over its inner side and having at its smaller end a structure for receiving a continuous stream of the feed material and accelerating the material so that it will move continuously onto and along the screen. This structure often has the form of a slightly flared cup leading from its upper edge to the base or smaller end of the screen.

In order to prevent fractures and losses of the finely divided solids sliding over the screen during the operation of the centrifugal, while filtering off the liquid component of the feed material, the screen openings must be extremely small. This requires that the screen be extremely thin, which in turn makes it quite fragile and easily susceptible to damage by lumps, foreign objects or other oversize solids in the feed material. These solids are pressed against the screen with great force by the high speed rotation of the basket, and resulting tears in the screen are a frequent cause of faulty centrifugal separation and of costly shutdowns and screen replacements.

According to the present invention, a trapping ring serving to collect trash, such as lumps and foreign objects, from the feed material before the material reaches the screen is fixed within the basket between the accelerating structure and the basket screen in position to be engaged by any trash in the flow of accelerated feed material passing to the screen.

The trapping ring is fixed within the basket by mounting it on supporting legs spaced apart thereabout, or by other suitable means, whereby its outer edge is spaced from the basket wall by a limited distance permitting a normal flow of accelerated feed material to pass freely from the accelerating structure to the base of the screen but causing any trash to be obstructed and trapped out of the moving material by engagement with the ring.

The trapping ring may be formed advantageously with a circular series of openings extending through an inward portion thereof, so that when foreign objects, lumps or other trash have been collected by the ring the accelerated feed material will still be able to pass to the screen by flowing over the collected trash and through the ring openings to reach the screen.

It has been found that the provision of a trapping ring in the basket as herein set forth not only protects the screen so as to prolong its serviceability and reduce needs for interruptions of the centrifugal operations but also often improves the separating action of the centrifugal by ensuring a more even distribution of the feed material onto the basket screen.

The above and other objects, features and advantages of the invention will be further apparent from the following detailed description of an illustrative embodiment thereof, which is to be read in connection with the accompanying drawing. In the drawing:

FIG. 1 is a fragmentary vertical sectional view of a continuous centrifugal machine having a basket constructed according to the invention;

FIG. 2 is an enlarged fragmentary view, partly in cross-section, of a portion of the conical basket construction; and FIG. 3 is a greatly enlarged fragmentary view of a portion of the perforated basket wall and screen.

As seen in FIG. 1 of the drawing, a centrifugal basket 10 having an upwardly opening perforated frusto-conical wall 12 covered by a filtering screen 13 is mounted for rotation on a vertical axis through an annular end structure 16 and a central hub 18 at the lower, smaller end of the basket. The hub 18 is connected and rotated with a shaft 19 on bearings mounted in a non-rotary housing 20 at the center of the machine. The bearing housing, shaft and basket are supported from a base plate 22 by a series of brackets 23 integral with housing 20, each of these being connected through a resilient coupling at 24 with a bracket 25 mounted on the base plate. The shaft 19 carries at its lower end a pulley 26 that is driven by belts 27 from a suitable motor-driven driving pulley (not shown).

The annular end structure 16 of the basket contains an upwardly opening accelerating cup 30 disposed between it and the hub 18 and removably secured in place, as by bolts 31. The side wall of the cup has a slightly flared frusto-conical surface 32 (FIG. 2) merging at the top of the cup into a more steeply flared lip or clamping ring 34 which overlaps the lower margin 13a of the basket screen so as to clamp the screen against the smaller end portion of wall 12, and which leads onto the screen the flow of accelerated feed material passing from the cup 30. This flow is produced by the centrifugal action of the cup on a stream of the feed material charged continuously into the cup from a feed pipe 36 opening thereinto at one side of the hub 18.

The upper end of the basket is defined by a top rim 38 the inner surface of which constitutes an extension of the frusto-conical screen surface and terminates in a discharge edge 39 over which the solids separated from the feed material in the basket are passed continuously during the operation of the machine. The solids so discharged are received in a chamber 40 defined by a casing or curb 42 surrounding the basket. Inside this casing and around the perforated basket wall 12 are fixed partitions 44, 45, 46 and 47 which define above the base plate 22 a chamber such as indicated at 48, or a series of separate chambers when desired, for collecting and leading away the liquid or liquids purged from solids in the rotating basket. An outwardly flaring frusto-conical skirt 49 mounted on top rim 38 assists in preventing liquid at the outer side of basket wall 12 from being driven by centrifugal force into the solids collecting chamber at 40.

The conical centrifugal basket shown in the drawing is one having its perforated wall 12 and screen 13 constructed as disclosed in a co-pending application, Ser. No. 356,763, filed Apr. 2, 1964, now U.S. Patent No. 3,283,910. The thinness of the screen will be evident from the greatly enlarged view thereof in FIG. 3. It will be understood that perforated conical walls and screens of various other forms may be used but that the screen will be extremely thin and fragile in any case of a machine to be used for the continuous centrifuging of a feed material, such as a sugar massecuite, containing very finely divided solids to be separated from a viscous liquid by the centrifugal action of the rotating basket.

According to the illustrated embodiment of the present invention, as seen in FIGS. 1 and 2, a trapping means, or trash trap, in the form of a substantially flat, substantially horizontal ring 50, is mounted inside the basket near the smaller end thereof, at a location between the accelerating cup 30 and the screen 13. The outer edge 51 of this ring is spaced from the nearest adjacent portion 52 of the conical basket wall by a distance sufficient to permit a normal flow of accelerated feed material to pass freely outside the ring from the top of the cup to the screen; yet this distance or gap is so limited that trash present in the feed material, such as lumps of agglomerated sugar crystals, foreign objects, or the like, will be obstructed by the ring and thus prevented from passing onto the screen. A gap of, for example, about 5/32 inch has been found quite effective in a basket for the continuous centrifuging of a low grade sugar massecuite.

In the embodiment shown the ring 50 is mounted in the required location by a plurality of legs 53 thereon, which are spaced apart about the underside of the ring and are joined securely, as by welding, to the flared lip or clamping ring 34 over which the accelerated feed material flows from the inner surface 32 of cup 30 to the smaller end of the screen 13. Once the ring 50 has been fixed to the lip 34 in position to provide an annular gap of the limited width desired for trapping trash from the feed material flowing to the screen, this gap will always be maintained by the proper positioning of the cup in the basket.

The ring 50 lies substantially radially in the basket and is made with a width or radial extent giving it the desired accumulating capacity for trash trapped beneath it, yet enabling the accumulation of trash to be observed by an attendant of the machine and limiting the amount accumulated so that there will be no hazard of causing dangerously unbalanced rotation of the basket. The inner edge 54 of the ring is spaced relatively so little from its outer edge 51 yet relatively so far from the hub 18 that any objectionable accumulation of trash can be noticed by an attendant who, upon noticing it, can stop the rotation of the basket and then remove the trapped material simply by reaching between the hub and the ring and manually dislodging them.

Further, as seen in FIG. 2, the ring 50 preferably is made with an imperforate outer portion 56 and with a perforated inner portion having at least one circular series of openings 57 extending therethrough. These openings are made large enough for the feed material to flow freely through them, but not large enough for trash trapped beneath the ring to pass through them to the screen. Accordingly, when trash caught between the ring and the basket portion at 52 obstructs the normal passageway for the accelerated feed material, the feed material nevertheless can flow over the trapped trash and through the ring openings 57 to reach the screen, to which it will pass radially over the face of the ring 50 under the centrifugal force imparted to it by the basket rotation.

The ring acting upon trash in the feed material between the accelerating cup and the screen of the basket not only protects the screen against damage from trash often present in the feed material; it has also been found to have the important effect of causing a more uniform and better controlled performance of the centrifugal machine. It gives this effect by requiring a substantially even distribution and flow of the feed material to and about the entire circumference of the screen and preventing waves of the feed material from reaching the screen when there are irregularities in the rate of charging the basket.

While a preferred embodiment of the invention has been described hereinabove and illustrated in the accompanying drawing, it is to be understood that the invention is not limited to this particular embodiment and that it may be embodied in various other forms of apparatus within the spirit and scope of the appended claims.

What is claimed is:

1. In a continuous centrifugal basket adapted to be rotated continuously at high speed, comprising a perforated frusto-conical wall provided with a screen over its inner side for separating liquid and solid components of a feed material to be centrifuged and means adjacent the smaller end of said wall for receiving a continuous flow of said material and accelerating the same toward said screen, means in said basket adjacent said smaller end and adjacent the path of normal flow of said material from said accelerating means to said screen for passing a normal flow of feed material evenly along said path to said screen yet trapping from the accelerated feed material before it reaches said screen pieces of trash larger than the solids normally contained in said material.

2. In a continuous centrifugal basket adapted to be rotated continuously at high speed, comprising a perforated frusto-conical wall provided with a screen over its inner side for separating liquid and solid components of a feed material to be centrifuged and means adjacent the smaller end of said wall for receiving a continuous flow of said material and accelerating the same toward said screen, means in said basket adjacent said smaller end and adjacent the path of normal flow of said material from said accelerating means to said screen for passing a normal flow of feed material evenly along said path to said screen yet trapping from the accelerated feed material before it reaches said screen pieces of trash larger than the solids normally contained in said material, said trapping means including surfaces for collecting trash trapped from the accelerated material and means for passing accelerated feed material obstructed by collected trash over the latter to said screen.

3. In a continuous centrifugal basket adapted to be rotated continuously at high speed, comprising a perforated frusto-conical wall provided with a screen over its inner side for separating liquid and solid components of a feed material to be centrifuged and means adjacent the smaller end of said wall for receiving a continuous flow of said material and accelerating the same toward said screen, means in said basket adjacent said smaller end and adjacent the path of normal flow of said material from said accelerating means to said screen for trapping trash from the accelerated feed material before the material reaches said screen, said trapping means comprising a ring mounted in spaced relation to a portion of said basket that leads the accelerated feed material to said screen, the space between said ring and said basket portion being so limited that a normal flow of said material containing solids of normal size will pass between said ring and said basket portion while pieces of trash larger than said solids, if present in said material, will be prevented from passing therebetween and collected by the ring.

4. A continuous centrifugal basket according to claim 3, said ring being substantially flat and lying substantially radial to the basket axis and being mounted on supporting legs spaced apart about said ring and connecting it with a frusto-conical portion of said basket.

5. A continuous centrifugal basket according to claim 3, including a clamping ring at the smaller end of said wall for securing said screen on said wall, said trash trapping ring being mounted on and being removable from the basket with said clamping ring.

6. In a continuous centrifugal basket adapted to be rotated continuously at high speed, comprising a perforated frusto-conical wall provided with a screen over its inner side for separating liquid and solid components of a feed material to be centrifuged and means adjacent the smaller end of said wall for receiving a continuous flow of said material and accelerating the same toward said screen, means in said basket adjacent said smaller end and adjacent the path of normal flow of said material from said accelerating means to said screen for trapping trash from the accelerated feed material before the feed material reaches said screen, said trapping means comprising a ring mounted in spaced relation to a portion of said basket that leads the accelerated feed material to said screen, the space between said ring and said basket portion being so limited that a normal flow of said material containing solids of normal size will pass between said ring and said basket portion while pieces of trash larger than said solids, if present in said material, will be prevented from passing therebetween and be collected by the ring, said ring being substantially flat and lying substantially radial to the basket axis and having a substantially imperforate outer annular portion for trapping trash from the feed material and an inner annular portion formed with a circular series of openings therethrough for passing feed material obstructed by trapped trash over the latter and through the ring to said screen, said openings being of a size insufficient to pass said trash therethrough.

7. In a continuous centrifugal basket adapted to be rotated continuously at high speed, comprising a perforated frusto-conical wall provided with a screen over its inner side for separating liquid and solid components of a feed material to be centrifuged, means including a central hub spaced radially from the smaller end of said wall for mounting the basket, an annular cup surrounding said hub and extending to a location near the smaller end of said screen for receiving a continuous flow of said material and accelerating the same toward said screen, a frusto-conical clamping ring forming the rim of said cup for securing said screen to said wall, and a trash trapping ring mounted on said clamping ring in radially spaced relation to a portion of the basket that leads the accelerated feed material from said cup to said screen, the space between said trapping ring and said basket portion being so limited that solids of normal size in the feed material will pass therebetween while pieces of trash larger than such solids will be prevented from passing therebetween and collected by the trapping ring.

References Cited

UNITED STATES PATENTS

| 3,283,910 | 11/1966 | Grieselhuber | 210—380 |
| 1,991,490 | 2/1935 | Brewer | 210—297 X |
| 3,050,190 | 8/1962 | Siepe | 210—380 |
| 3,226,257 | 12/1965 | Steele et al. | 210—380 X |

FOREIGN PATENTS 14,720   3/1916   Great Britain.

SAMIH N. ZAHARNA, *Primary Examiner.*

REUBEN FRIEDMAN, *Examiner.*

F. SPEAR, *Assistant Examiner.*